United States Patent Office 3,251,865
Patented May 17, 1966

3,251,865
1-SUBSTITUTED ESTRATRIENES
Edward Warren Cantrall, New City, Ransom Brown Conrow, Pearl River, and Seymour Bernstein, New City, N.Y., assignors to American Cyanamid Company, Stamford, Conn., a corporation of Maine
No Drawing. Filed Apr. 23, 1964, Ser. No. 362,161
21 Claims. (Cl. 260—397.4)

This invention relates to new steroid compounds. More particularly, it relates to C1-substituted estra-1,3,5(10)-trienes and their preparation.

The novel steroids of this invention can be illustrated by the following formula:

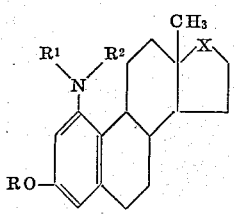

wherein R is selected from the group consisting of hydrogen and lower alkyl; $R^1$ and $R^2$ are selected from the group consisting of hydrogen, lower alkyl, mono-nuclear aryl, and lower alkylene mono-nuclear aryl; lower alkanoyl, aroyl and lower alkoxy aroyl; X is selected from the group consisting of $>C=O$;

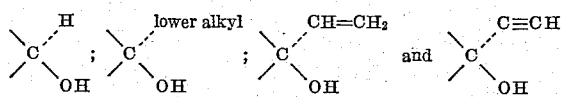

and acid addition and quaternary ammonium salts thereof.

The present compounds are, in general, crystalline solids relatively insoluble in organic solvents such as lower alkyl alcohols, acetone, ethyl acetate, benzene, toluene, chloroform, ether, petroleum ether and the like.

The present compounds which are described broadly as 1-aminoestratrienes substituted in the 11 or 17-positions can be made from the appropriate starting material by deriving them from the corresponding 4-amino derivatives [the latter prepared by the procedure of A. J. Tomson and J. P. Horwitz, J. Org. Chem., 24, 2056 (1959)]. This process as outlined, consists of coupling of the 4-amino compound with an aryldiazonium salt, removal of the 4-amino group followed by reductive cleavage of the azo group to the corresponding 1-amino derivatives.

The following 4-amino derivatives are obtained from the corresponding starting materials lacking a 4-amino substituent by nitration (nitric acid-acetic acid) and methylation (dimethylsulfate), followed by reduction (sodium hydrosulfite); e.g.

estrone→4-nitroestrone→4-nitroestrone methyl ether→4-aminoestrone methyl ether;
4-amino-3-methoxy-19-norpregna-1,3,5(10)-trien-20-one;
4-amino-11β-acetoxy-3-methoxyestra-1,3,5(10)-trien-17-one;
4-amino-17,20;
20,21-bismethylenedioxy-3-methoxy-19-norpregna-1,3,5(10)-trien-11β-ol 11-acetate;
4-amino-3-methoxyestra-1,3,5(10)-trien-16α,17β-diol 16, 17-diacetate and
4-amino-3-methoxyestra-1,3,5(10)-trien-17β-ol-16-one 17-acetate.

The 4-amino steroids immediately above may be transformed into the following 1-amino compounds by methods described hereinafter:

1-amino-3-methoxyestra-1,3,5(10)-trien-17-one;
1-amino-3-methoxy-19-norpregna-1,3,5(10)-trien-20-one;
1-amino-11β-acetoxy-3-methoxyestra-1,3,5(10)-trien-17-one;
1-amino-17,20;
20,21-bismethylenedioxy-3-methoxy-19-norpregna-1,3,5(10)-trien-11β-ol 11-acetate;
1-amino-3-methoxyestra-1,3,5(10)-trien-16α,17β-diol 16, 17-diacetate;
1-amino-3-methoxyestra-1,3,5(10)-trien-17β-ol-16-one 17-acetate.

The compounds of the present invention also possess utility as starting materials for the preparation of various C4-substituted 1-aminoestra-1,3,5(10)-trienes. Thus, instead of treating the intermediates diazonium salts described hereinafter with hypophosphorous acid, one can, under conditions known to those skilled in the art, replace the diazonium group with chlorine, bromine, fluorine, iodine and cyanide substituents to give compounds among which are the following:

1-(p-nitrophenylazo)-3-methoxy-4-chloroestra-1,3,5(10)-trien-17-one;
1-(p-tolylazo)-3-methoxy-4-chloroestra-1,3,5(10)-trien-17-one;
1-(p-bromophenylazo)-3-methoxy-4-chloroestra-1,3,5(10)-trien-17-one;
1-phenylazo-3-methoxy-4-chloroestra-1,3,5(10)-trien-17-one;
1-(p-sulfo-phenylazo)-3-methoxy-4-chloroestra-1,3,5(10)-trien-17-one;
1-(p-nitrophenylazo)-3-methoxy-4-bromoestra-1,3,5(10)-trien-17-one;
1-(p-tolylazo)-3-methoxy-4-bromoestra-1,3,5(10)-trien-17-one;
1-(p-bromophenylazo)-3-methoxy-4-bromoestra-1,3,5(10)-trien-17-one;
1-phenylazo-3-methoxy-4-bromoestra-1,3,5(10)-trien-17-one;
1-(p-sulfophenylazo)-3-methoxy-4-bromoestra-1,3,5(10)-trien-17-one;
1-(p-nitrophenylazo)-3-methoxy-4-fluoroestra-1,3,5(10)-trien-17-one;
1-(p-tolylazo)-3-methoxy-4-fluoroestra-1,3,5(10)-trien-17-one;
1-(p-bromophenylazo)-3-methoxy-4-fluoroestra-1,3,5(10)-trien-17-one;
1-phenylazo-3-methoxy-4-fluoroestra-1,3,5(10)-trien-17-one;
1-(p-sulfophenylazo)-3-methoxy-4-fluoroestra-1,3,5(10)-trien-17-one;
1-(p-nitrophenylazo)-3-methoxy-4-iodoestra-1,3,5(10)-trien-17-one;
1-(p-tolylazo)-3-methoxy-4-iodoestra-1,3,5(10)-trien-17-one;
1-(p-bromophenylazo)-3-methoxy-4-iodoestra-1,3,5(10)-trien-17-one;
1-phenylazo-3-methoxy-4-iodoestra-1,3,5(10)-trien-17-one;
1-(p-sulfophenylazo)-3-methoxy-4-iodoestra-1,3,5(10)-trien-17-one;
1-(p-nitrophenylazo)-3-methoxy-4-cyanoestra-1,3,5(10)-trien-17-one;
1-(p-tolylazo)-3-methoxy-4-cyanoestra-1,3,5(10)-trien-17-one;
1-(p-bromophenylazo)-3-methoxy-4-cyanoestra-1,3,5(10)-trien-17-one;

1-phenylazo-3-methoxy-4-cyanoestra-1,3,5(10)-trien-17-one;
1-(p-sulfophenylazo)-3-methoxy-4-cyanoestra-1,3,5(10)-trien-17-one,
and the like.

Furthermore, the above compounds can, by the conditions described for instance in Example 7 or by other suitable conditions, be reduced to the corresponding 1-amino derivatives such as for example:

1-amino-3-methoxy-4-chloroestra-1,3,5(10)-trien-17-one;
1-amino-3-methoxy-4-bromoestra-1,3,5(10)-trien-17-one;
1-amino-3-methoxy-4-iodoestra-1,3,5(10)-trien-17-one;
1-amino-3-methoxy-4-cyanoestra-1,3,5(10)-trien-17-one;
1-amino-3-methoxy-4-fluoroestra-1,3,5(10)-trien-17-one.

The 1-amino steroids of the present invention when administered to rats produce a lowering of blood cholesterol and therefore are useful as hypocholesterolemic agents. They also show bactericidal and fungicidal activity. Moreover they may be converted into 1,11-imino-estratrienes useful compounds described and claimed in our copending application Serial No. 362,185, filed April 23, 1964.

The following examples describe in detail the preparation of representative estratrienes of the present invention.

EXAMPLE 1

*1-(p-nitrophenylazo)-3-methoxy-4-aminoestra-1,3,5(10)-trien-17-one*

To a stirred solution of 7.0 g. (50.5 mmoles) of p-nitroaniline in 50 ml. of glacial acetic acid and 75 ml. of 2.0 N hydrochloric acid (150 mmoles) at −5° C. is added a solution of 3.48 g. (50.1 mmoles) of sodium nitrite in 15 ml. of water below the surface of the liquid, and stirring is continued for 15 minutes. The resulting solution of p-nitrobenzene diazonium chloride is poured into a well-stirred solution of 14.97 g. (50.0 mmoles) of 4-amino-3-methoxyestra-1,3,5(10) - trien - 17-one (M.P. 189°–193° C.) [J. Org. Chem., 24, 2056 (1959)] in 250 ml. of glacial acetic acid and 25 ml. 5.0 N sodium hydroxide (125 mmoles) at room temperature. The deep red mixture is diluted with one liter of water, allowed to stand overnight then filtered and the product washed thoroughly on the filter with water. The yield of crude material after drying is 21.0 g. (94%), M.P. 185°–190° C.

The crude product, which contained some combined hydrogen chloride, is dissolved in methylene chloride (250 ml.), and then methanol (500 ml.) plus triethylamine (5.0 ml.) is added portionwise to the boiling solution until all of the methylene chloride has been removed. The resulting mixture gives 19.61 g. (87% yield) of very deep red crystals, M.P. 242°–243° dec., which contains only minor impurities by thin layer chromatographic analysis, and is sufficiently pure for the next step.

A pure sample is obtained by chromatography on activated magnesium silicate (50–100 mesh) using 15% ether-benzene as eluant. Crystallization of the product from methylene chloride-methanol, as above, gives material of M.P. 243°–244° dec.

EXAMPLE 2

*1-(p-tolylazo)-3-methoxy-4-aminoestra-1,3,5(10)-trien-17-one*

Substitution of 5.4 g. of p-methylaniline for p-nitroaniline employed in Example 1, affords 1-(p-tolylazo)-3-methoxy-4-aminoestra-1,3,5(10)-trien-17-one.

EXAMPLE 3

*1-(p-bromophenylazo)-3-methoxy-4-aminoestra-1,3,5(10)-trien-17-one*

Substitution of 8.7 g. of p-bromoaniline for p-nitroaniline employed in Example 1 affords 1-(p-bromophenylazo)-3-methoxyestra-1,3,5(10)-trien-17-one.

EXAMPLE 4

*1-phenylazo-3-methoxy-4-aminoestra-1,3,5(10)-trien-17-one*

Substitution of 4.7 g. of aniline for p-nitroaniline in Example 1 affords 1-phenylazo-3-methoxy-4-aminoestra-1,3,5(10)-trien-17-one.

EXAMPLE 5

*1-(p-sulfophenylazo)-3-methoxy-4-aminoestra-1,3,5(10)-trien-17-one*

Substitution of 8.8 g. of sulfanilic acid for p-nitroaniline in Example 1 affords 1-(p-sulfophenylazo)-3-methoxy-4-aminoestra-1,3,5(10)-trien-17-one.

EXAMPLE 6

*1-(p-nitrophenylazo)-3-methoxyestra-1,3,5(10)-trien-17-one*

To a stirred solution of 17.94 g. of (0.04 mole) of 1-(p-nitrophenylazo)-3-methoxy-4-aminoestra - 1,3,5(10)-trien-17-one (M.P. 242–243° C. dec.) in 400 ml. of glacial acetic acid and 100 ml. of 30% (w./w.) aqueous sulfuric acid at 0° C. is added a solution of 3.04 g. (0.044 mole) of sodium nitrite in 30 ml. of water below the surface of the liquid. Stirring is continued at 0° C. for 15 minutes then 450 ml. of 50% aqueous hypophosphorous acid is added and the mixture stirred overnight (16 hours) at room temperature. The precipitate is filtered, washed thoroughly with water and dried to give 16.4 g. (95% yield) of crude red-brown product, M.P. 203°–205° C. Crystallization from methylene chloride-methanol gives 15.31 g. (89% yield) of red crystals, M.P. 216°–219° C. which contains only trace impurities by thin layer chromatographic analysis, and is pure enough for the next step. Chromatography of a sample on activated magnesium silicate (60–100 mesh), using 5% ether-benzene as eluant, followed by crystallization of the product from methylene chloride-methanol gives an analytically pure sample, M.P. 223–224° C.

EXAMPLE 7

*1-amino-3-methoxyestra-1,3,5(10)-trien-17-one*

A solution of 13.0 g. (0.03 mole) of 1-(p-nitrophenylazo)-3-methoxyestra-1,3,5(10)-trien-17-one (M.P. 215°–217° C.) in 100 ml. of methylene chloride is added to a stirred mixture of 30 g. of zinc dust in 300 ml. of glacial acetic acid over approximately 10 minutes. The initial temperature of 23° soon rises to 40°–45° and is maintained in this range during the reaction by occasional cooling in a water bath. An additional 30 g. of zinc dust is added after half of the steroid is fed in. The mixture is stirred for a further 10 minutes then filtered and the residue of zinc washed on the filter with acetic acid. The filtrate is concentrated under reduced pressure to approximately 125 ml., diluted with 500 ml. of water and extracted with chloroform. The extract is washed with two portions of water, dried over magnesium sulfate, concentrated to a volume of 100 ml. and filtered through a bed of magnesium silicate (60 g.) using 300 ml. of chloroform wash. The filtrate is evaporated under reduced pressure to a small volume and crystallized from methanol to give 5.58 g. of grey solid, M.P. 198°–208° C., which contains a trace of p-phenylenediamine impurity. An additional 1.0 g. of product, M.P. 209°–213° C., is obtained by chromatography of the filtrate on magnesium silicate (60–100 mesh)

using 20% ethyl acetate-n-hexane as eluant, followed by crystallization of the product from methylene chloride-ether. The total yield of product is therefore 6.58 g. (73%).

Analytically pure material is obtained by chromatography of a sample on activated magnesium silicate as above, followed by crystallization from methanol to give a white crystalline product, M.P. 213°–214° C.

EXAMPLE 8

*1-amino-3-methoxyestra-1,3,5(10)-trien-17β-ol*

Sodium borohydride (1.9 g.) is added to a suspension of 1-amino-3-methoxyestra-1,3,5(10)-trien-17 - one (3.0 g.) in methanol (200 ml.). The resulting mixture is stirred for 30 minutes at room temperature, acidified with acetic acid and evaporated. The residue is partitioned between ether and water, and the ether phase is dried over anhydrous sodium sulfate and evaporated to give the product of the example.

EXAMPLE 9

*1-amino-3-methoxy-17α-methylestra-1,3,5(10)-trien-17β-ol*

To a freshly prepared solution of methyl magnesium iodide (4.2 ml. of methyl iodide and 1.6 g. of magnesium turnings) in ether (30 ml.) is added a solution of 1-amino-3-methoxyestra-1,3,5(10)-trien-17 - one (0.9 g.) in ether (25 ml.). The resulting mixture is heated to reflux for 6 hours, cooled and quenched by the dropwise addition of excess ammonium chloride solution. The ether phase is separated and the aqueous phase is extracted several times with methylene chloride. The combined extracts are washed with water, dried and evaporated to give the product of the example.

EXAMPLE 10

*1-amino-17α-ethynyl-3-methoxyestra-1,3,5(10)-trien-17β-ol*

A solution of potassium acetylide in liquid ammonia is prepared by bubbling acetylene into a solution containing 6 g. of potassium in 300 ml. of liquid ammonia until the blue color disappears. To it is added dropwise a solution of 2.6 g. of 1-amino-3-methoxyestra-1,3,5(10)-trien-17-one in 150 ml. of ether. After 2 hours the cooling bath is removed and the mixture is allowed to warm to room temperature and stored overnight. Dilute sulfuric acid (8%, 125 ml.) is added dropwise to the mixture and it is extracted with ether. The extract is washed with saturated sodium chloride solution, dried and evaporated to give the product of the example.

EXAMPLE 11

*1-amino-17α-vinyl-3-methoxyestra-1,3,5(10)-trien-17β-ol*

A mixture of 0.3 g. of 1-amino-17α-ethynyl-3-methoxyestera-1,3,5(10)-trien-17-one, 0.15 g. of 5% palladium-on-calcium carbonate catalyst and 20 ml. of pyridine is stirred under an atmosphere of hydrogen until one equivalent of hydrogen is taken up. The catalyst is removed by filtration and the filtrate is evaporated to dryness in vacuo to give the product of the example.

EXAMPLE 12

*1-amino-17α-ethyl-3-methoxyestra-1,3,5(10)-trien-17β-ol*

To a solution of 2.0 g. of 1-amino-17α-ethynyl-3-methoxyestra-1,3,5(10)-trien-17β-ol in 50 ml. of absolute dioxane is added 0.2 g. of 5% palladium-on-charcoal catalyst. The resulting mixture is placed under a hydrogen atmosphere and stirred until two moles of hydrogen are taken up. The catalyst is filtered and the filtrate evaporated to give the product of the example.

EXAMPLE 13

*3-methoxy-1-dimethylaminoestra-1,3,5(10)-trien-17-one*

A mixture composed of 3 g. of 1-amino-3-methoxyestra-1,3,5(10)-trien-17-one, 2 g. of 35% formaldehyde and 50 ml. of 90% formic acid is heated to reflux overnight. The reaction mixture is evaporated in vacuo and the residue is partitioned between ether and 5% sodium hydroxide solution. The ether phase is washed with water, dried and evaporated to give the product of the example.

EXAMPLE 14

*1-benzylamino-3-methoxyestra-1,3,5(10)-trien-17-one*

A mixture of 1.5 g. of 1-amino-3-methoxyestra-1,3,5(10)-trien-17-one, 0.6 g. of benzaldehyde and 25 ml. of 90% formic acid is heated to reflux overnight, cooled and evaporated to give the product of the example.

EXAMPLE 15

*1-(N-benzyl-N-methyl)amino-3-methoxyestra-1,3,5(10)-trien-17-one*

Substitution of 1 - benzylamino - 3 - methoxyestra-1,3,5(10)-trien-17-one for 1-amino-3-methoxyestra-1,3,5(10)-trien-17-one in Example 13 affords the product of the example.

EXAMPLE 16

*1-(N-methylamino)-3-methoxyestra-1,3,5(10)-trien-17-one*

A solution of 1 g. of 1-(n-benzyl-N-methyl)-amino-3-methoxyestra-1,3,5(10)-trien-17-one in 75 ml. of glacial acetic acid is treated with 0.2 g. of 10% palladium-on-charcoal catalyst. The resulting mixture is placed under a hydrogen atmosphere and stirred until one molecular equivalent of hydrogen has been absorbed. The catalyst is removed by filtration and the filtrate is evaporated to give the product of the example.

EXAMPLE 17

*1-acetylamino-3-methoxyestra-1,3,5(10)-trien-17-one*

To a solution of 0.5 g. of 1-amino -3-methoxyestra-1,3,5(10)-trien -17-one in 10 ml. of pyridine is added 10 ml. of acetic anhydride. The resulting solution is heated on a steam bath for 1 hour and then allowed to stand at room temperature overnight. The excess acetic anhydride is decomposed with methanol and the solution is evaporated. The residue is partitioned between ether-methylene chloride (2:1) and 5% sodium carbonate solution. The organic phase is dried and evaporated to give the product of the example.

EXAMPLE 18

*1-propionylamino-3-methoxyestra-1,3,5(10)-trien-17-one*

Substitution of propionic anhydride for acetic anhydride in Example 17 gives the product of the example.

EXAMPLE 19

*1-benzoylamino-3-methoxyestra-1,3,5(10)-trien-17-one*

Substitution of 0.3 g. of benzoyl chloride for the acetic anhydride in Example 17 gives the product of the example.

EXAMPLE 20

*1-(3',4',5'-trimethoxybenzoyl)amino-3-methoxyestra-1,3,5(10)-trien-17-one*

Substitution of 0.4 g. of 3,4,5-trimethoxybenzoyl chloride for the acetic anhydride of Example 17 gives the product of the example.

EXAMPLE 21

*1-amino-3-hydroxyestra-1,3,5(10)-trien-17-one*

Treatment of 1-amino-3-methoxyestra-1,3,5(10)-trien-17-one (Example 7) with pyridine hydrochloride gives the product of the example.

EXAMPLE 22

*1-amino-17α-ethynylestra-1,3,5(10)-triene-3,17β-diol*

Treatment of 1-amino-3-hydroxyestra-1,3,5(10)-trien-17-one with a solution of potassium actylide in liquid ammonia as in Example 10 gives the 3,17-diol, the product of the example.

EXAMPLE 23

*1-dimethylamino-3-hydroxyestra-1,3,5(10)-trien-17-one*

Treatment of 3 - methoxy - 1 - dimethylaminoestra-1,3,5(10)-trien-17-one with pyridine hydrochloride gives the product of the example.

EXAMPLE 24

*1-dimethylamino-3-hydroxyestra-1,3,5(10)-trien-17-one hydrochloride*

Treatment of 1 - dimethylamino - 3 - hydroxyestra-1,3,5(10)-trien-17-one in a mixture of ether and chloroform with hydrogen chloride gives the desired hydrochloride salt.

EXAMPLE 25

*1-amino-3-hydroxyestra-1,3,5(10)-trien-17-one hydrochloride*

Treatment of 1-amino-3-hydroxyestra-1,3,5(10)-trien-17-one in a mixture of ether and chloroform with hydrogen chloride gives the desired hydrochloride salt.

EXAMPLE 26

*1-dimethylamino-3-hydroxyestra-1,3,5(10)-trien-17-one methiodide*

A solution of 1 - dimethylamino - 3 - hydroxyestra-1,3,5(10)-trien-17-one in ether-methanol is treated with methyl iodide to give the methiodide.

EXAMPLE 27

*1-amino-3-methoxyestra-1,3,5(10)-trien-17-one hydrochloride*

Treatment of 1-amino-3-methoxyestra-1,3,5(10)-trien-17-one in a mixture of ether and chloroform with hydrogen chloride gives the hydrochloride.

EXAMPLE 28

*1-amino-3-hydroxyestra-1,3,5(10)-trien-17-one hydrosulfate*

Treatment of 1-amino-3-hydroxyestra-1,3,5(10)-trien-17-one in a mixture of ether and methanol with sulfuric acid gives the hydrosulfate salt.

We claim:
1. A compound of the formula:

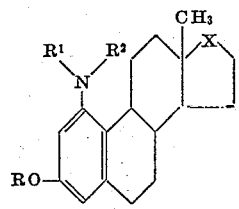

wherein R is selected from the group consisting of hydrogen and lower alkyl; $R^1$ and $R^2$ are selected from the group consisting of hydrogen, lower alkyl, mono-nuclear aryl, and lower alkylene mono-nuclear aryl; lower alkanoyl, aroyl and lower alkoxy aroyl; X is selected from the group consisting of >C=O

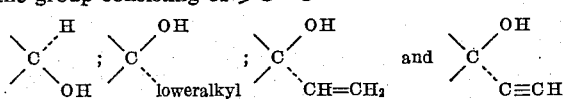

and acid addition and quaternary ammonium salts thereof.

2. The compound 1-amino-3-methoxyestra-1,3,5(10)-trien-17-one.
3. The compound 1-amino-3-methoxyestra-1,3,5(10)-trien-17β-ol.
4. The compound 1-amino-3-hydroxyestra-1,3,5(10)-trien-17-one.
5. The compound 1-amino-3-hydroxyestra-1,3,5(10)-trien-17-one hydrochloride.
6. The compound 1-amino-3-hydroxyestra-1,3,5(10)-trien-17-one hydrosulfate.
7. The compound 1 - acetylamino - 3 - methoxyestra-1,3,5(10)-trien-17-one.
8. The compound 1-benzyolamino-3-methoxyestra-1,3,5(10)-trien-17-one.
9. The compound 1 - (3',4',5' - trimethoxybenzoyl)-amino-3-methoxyestra-1,3,5(10)-trien-17-one.
10. The compound 1-benzylamino-3-methoxyestra-1,3,5(10)-trien-17-one.
11. The compound 3-methoxy-1-di(loweralkyl)amino-estra-1,3,5(10)-trien-17-one.
12. The compound 3-methoxy-1-dimethylaminoestra-1,3,5(10)-trien-17-one.
13. The compound 1-(N-benzyl-N-methyl)amino-3-methoxyestra-1,3,5(10)-trien-17-one.
14. The compound 1-(N-methylamino)-3-methoxy-estra-1,3,5(10)-trien-17-one.
15. The compound 1-dimethylamino-3-hydroxyestra-1,3,5(10)-trien-17-one hydrochloride.
16. The compound 1-amino-3-methoxy-17α-methyl-estra-1,3,5(10)-trien-17β-ol.
17. The compound 1-amino-17α-ethynyl-3-methoxy-estra-1,3,5(10)-trien-17β-ol.
18. The compound 1-amino-17α-vinyl-3-methoxyestra-1,3,5(10)-trien-17β-ol.
19. The compound 1-amino-17α-ethyl-3-methoxyestra-1,3,5(10)-trien-17β-ol.
20. The compound 1 - amino - 17α - ethynylestra-1,3,5(10)-triene-3,17β-diol.
21. The compound 1-dimethylamino-3-hydroxyestra-1,3,5(10)-trien-17-one methiodide.

No references cited.

LEWIS GOTTS, *Primary Examiner.*